United States Patent Office 3,328,472
Patented June 27, 1967

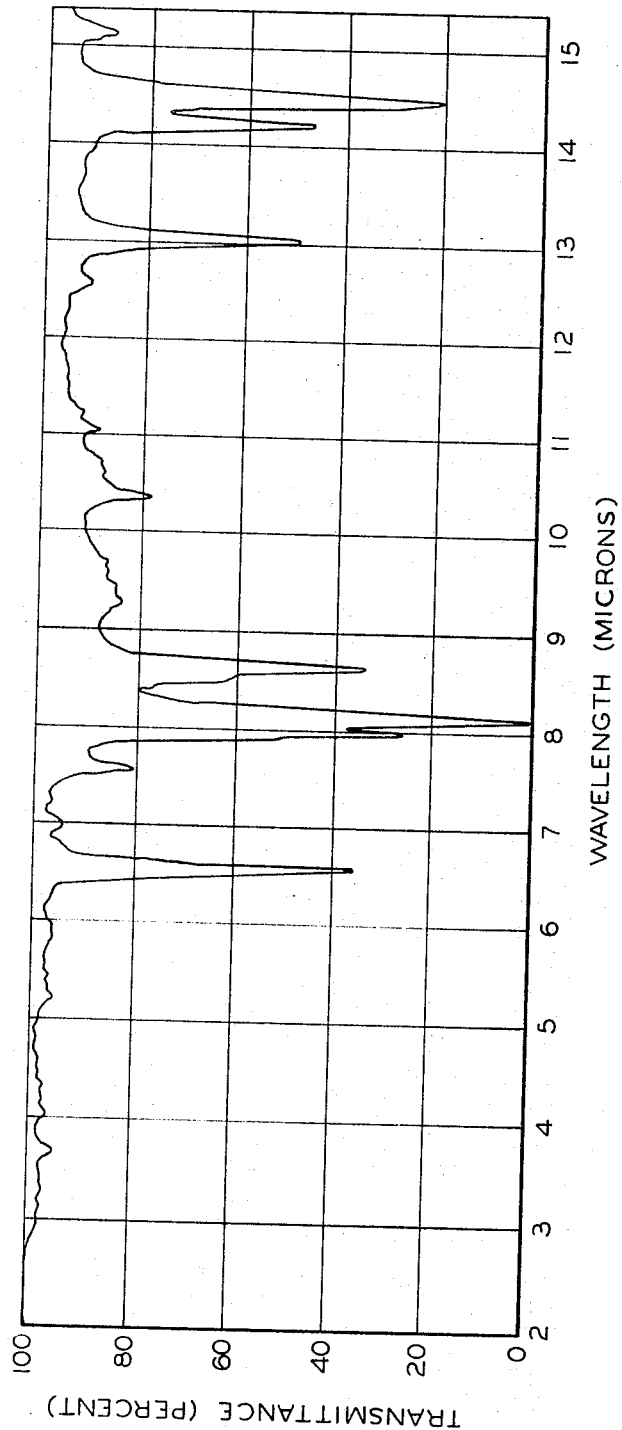

3,328,472
CHLOROCARBONS
Victor Mark, Olivette, Mo., assignor to Monsanto Company, a corporation of Delaware
Filed Dec. 2, 1960, Ser. No. 73,429
14 Claims. (Cl. 260—648)

This invention relates to a new chemical composition consisting solely of carbon and chlorine atoms. More specifically the invention is directed to a product prepared by the dechlorination of bis(pentachlorocyclopentadienyl).

The material from which the new compound is prepared is known and commercially available and is identified as having the structure

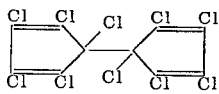

Two of the chlorine atoms may be removed from this $C_{10}Cl_{10}$ chlorocarbon by reacting the compound with a phosphorus acid ester having the structure

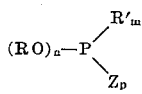

wherein R and R' are hydrocarbon or substituted hydrocarbon radicals; Z is fluorine, chlorine, bromine or iodine wherein $n$ is an integer from one (1) to three (3), $p$ is an integer from zero (0) to two (2), and $m$ is an integer from zero (0) to two (2), provided that the sum $n+m+p$ is always three (3).

The reaction taking place may be represented by the equation:

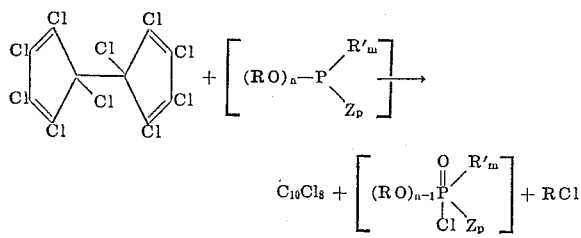

Suitable phosphorous acid esters for effecting the novel reaction are those having the general structure

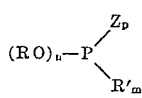

which must contain at least one (RO)-group and may contain no more than two of the total Z and R' groups; R and R' groups being organic radicals and Z being a halogen atom; provided that $m+n+p=3$.

The trivalent phosphorus ester reactants are of several different types. The most readily available phosphorous esters are the phosphites, including the trialkyl phosphites, such as trimethyl phosphite, triethyl phosphite, triisopropyl phosphite, tri-n-butyl phosphite, tris(2-chloroethyl) phosphite, tris(2-ethylhexyl) phosphite, tridodecyl phosphite, and trioctadecyl phosphite; the trialkenyl phosphites, such as the triallyl phosphite, tris(2-chloroallyl) phosphite, tris(bromocrotyl) phosphite, tris(undecyl-10-en-1-yl) phosphite, the trialkynyl phosphites, such as the tripropargyl phosphite, tritetrolyl phosphite and tris(undecyl-10-yn-1-yl) phosphite; the triaryl phosphites, such as triphenyl phosphite, trinaphthyl phosphite and tris-(biphenylyl) phosphite; the tris(araliphatic) phosphites, such as tribenzyl phosphite, triphenethyl phosphite and tricinnamyl phosphite; the tris(alkaryl) phosphites, such as tritolyl phosphite, trixylyl phosphite, tris(dodecylphenyl) phosphite and the tris(methylnaphthyl) phosphite; the tricycloalkyl phosphites, such as tricyclohexyl phosphite, tricyclopentyl phosphite, tris(cyclohex-2-enyl) phosphite and tris(cyclopent-2-enyl) phosphite; the heterocyclic phosphites, such as tris(tetrahydrofurfuryl) phosphite; and the substituted derivatives of the above groups. These include all kinds of substituents which do not, under the conditions of the dehalogenation reaction, react with the trivalent phosphorus ester. Such substituents include the halo, alkoxy, alkylthio, alkylamino, sulfinyl, acyloxy, hydroxyl, sulfonyl, amino, cyano, alkoxycarbonyl, acyl, carbonyl, thiocarbonyl, nitro, thiocyano, alkenoxy, alkynoxy and mercapto.

Mixed phosphites containing a plurality of esterifying radicals (as distinguished from the symmetrical phosphites described above) are also useful, for example, diethyl methyl phosphite, benzyl 2-ethoxyethyl phenyl phosphite, and cyclohexyl dimethyl phosphite. The unsymmetrical phosphite may contain two or three different hydrocarbonoxy (RO)-groups in any combination of the esterifying groups described in the next preceding paragraph.

Other phosphites may have one or two halogen atoms bonded to the phosphorus atom and these will have two or one available organic groups. This type of compound includes the halophosphites such as diethyl chlorophosphite, benzyl dibromophosphite, diallyl chlorophosphite, octadecyl dichlorophosphite, bis(ethoxypropyl) fluorophosphite, 3-nitrobutenyl dichlorophosphite, dimethyl iodophosphite and other phosphites containing less than three organic radicals and one or two halogen atoms.

The phosphonites containing only two esterifying groups, for example, the dimethyl methylphosphonite, the diethyl phenylphosphonite, the dipropyl benzylphosphonite, the dimethyl vinylphosphonite, the diallyl chloroethylphosphonite, the bis(2-chloroethyl) dodecylphosphonite, the dicyclohexyl cyclohexylphosphonite and the dicinnamyl phenylphosphonite can also be used. The halophosphonites containing a single ester group and having both an organic group and a halogen atom bonded to the phosphorus atom are all useful, for example, methyl benzylchlorophosphonite, decyl allylbromophosphonite and chloro ethyl phenyl phosphonite.

Although the phosphonites containing two like esterifying groups are preferred, because they are more readily available, the mixed esters may also be used. Thus, compounds such as ethyl propyl ethylphosphonite, ethyl phenyl phenylphosphonite, allyl methyl benzylphosphonite, and others containing two different radicals described above as esterifying radicals and a single organic radical substituted on the phosphorus atom can be used.

The dechlorination may also be effected by means of the phosphinite esters. These compounds have one ester group. The useful phosphinites, that is those trivalent phosphorus esters which have two organic radicals bonded directly to the phosphorus atom and have a single organic radical as the esterifying group, include methyl dimethylphosphonite, ethyl methylisopropylphosphinite, isopropyl benzyl(2 - chloroethyl)phosphinite, 2-chloroethyl diphenylphosphinite, allyl diphenylphosphinite, and other phosphinites which contain a single group of any of the esterifying groups described above with respect to the phosphites or phosphonites and two groups, different or identical, also selected from the above described esterifying groups substituted directly on the phosphorus atom.

Suitable organic substituents in the R and R' positions on the phosphite may be hydrocarbon radicals containing up to 20 carbon atoms; including the alkyl radicals, such as methyl, ethyl, n-propyl, isopropyl, t-butyl, pentyl, dodecyl and ethylhexadecyl radicals; the alkenyl radicals, such as vinyl, allyl, isopropenyl, methallyl, crotyl, undecenyl, octadecenyl, piperylenyl and sorbyl radicals; the alkylnyl radicals, such as propargyl, tetrolyl and octadecynyl radicals; the araliphatic radicals, such as the benzyl, the phenethyl, the cinnamyl and the phenylhexadecyl radicals; the hydrocarbon substituted araliphatic radicals, such as 2,4-dimethyl benzyl, p-cyclohexylphenethyl and p-isopropylcinnamyl; the aryl radicals, such as phenyl, naphthyl and biphenyl radicals; the hydrocarbon substituted aryl radicals, such as 2,4-dimethyl phenyl, 2-allylnaphthyl, p-cumenyl, and cyclopentylphenyl; the cycloaliphatic radicals, such as cyclohexyl, cyclopentyl, cyclohexenyl, cyclopentenyl, cycloheptyl, and cyclooctyl radicals; the hydrocarbon substituted cycloaliphatic radicals, such as phenylcyclopentyl, benzylcyclo-octyl, propylcyclohexyl and the dimethylcycloheptenyl radicals; and the said hydrocarbon radicals containing substituents of the group consisting of chlorine, such as 2-chloroethyl, 3-chloroallyl, p-chlorobenzyl; and bromine, such as 3-bromobutyl and 2-bromo-4-chlorobenzyl; iodine substituents, such as 2,4,6-triiodo benzyl and 2-iodoethyl; and the fluorine substituents such as trifluoroethyl and p-fluorobenzyl; nitro substituted radicals, such as m-nitrobenzyl; cyano substituted radicals such as 2-cyanoethyl; isocyano, such as 3-isocyanopropyl; thiocyano, such as thiocyanoethyl; the isothiocyano radicals, such as p-isothiocyanophenyl and 2-isothiocyanoethyl; mercapto substituted radicals, such as 2-mercaptoethyl; the hydroxyl substituted radicals such as p-hydroxybenzyl and 2,3-dihydroxypropyl; the hydrocarbonoxyl radicals, such as 2-methoxyethyl, 2-decylcloxyethyl, and p-phenoxybenzyl radicals; the acyloxy substituted radicals such as the 2-acetyloxypropyl, the acyl substituted radicals such as 2-acetylethyl and p-butyrylbenzyl; the hydrocarbonoxycarbonyl radicals, such as hexyloxycarbonylethyl, 2-hydroxy-3-methoxycarbonylethyl, methoxycarbonylcyclohexyl; hydrocarbonthio substituted radicals, such as 4-ethylthiobutyl, 3-phenylthiopropyl and 2-ethylthioethyl; the amino radicals, such as 2-aminoethyl; the hydrocarbonamino substituted radicals, such as dimethylaminoethyl, 2-anilinoethyl, and p-cyclohexylaminobenzyl; the hydrocarbon sulfonyl substituted radicals, such as p-dodecylsulfonylbenzyl; 3-methylsulfonylpropyl, 2-benzylsulfonylethyl and p-cyclohexylsulfonylbenzyl; the hydrocarbon sulfinyl, such as 3(t-butylsulfinyl)-propyl, 3-phenylthiobutyl, and 2-cyclohexylsulfinylpropyl; and the heterocyclic substitutents such as furyl, thienyl, tetrahydrofuryl, morpholyl, glycidyl and 3-piperidyl, dihydrofuryl, tetrahydrothienyl and dihydrothienyl.

Any of the above described trivalent phosphorus esters may be used to dechlorinate the $C_{10}Cl_{10}$ chlorocarbon, bis(pentachlorocyclopentadienyl). The dechlorination process can be effected by merely contacting the $C_{10}Cl_{10}$ compound with any of the listed phosphorous esters. The reaction with the more reactive phosphites takes place spontaneously even at and below room temperature and no heating of the reaction mixture is required. With the more electronegatively substituted phosphites, the reaction is best conducted above room temperature; even though the dehalogenation process is exothermic the application of external heating is advantageous in order to achieve a maximum conversion.

The reaction is best conducted in solution or in a two-phase system (slurry). The nature of the liquid vehicle is not critical, although it must not, under the conditions of the reaction, react with either of the reactants. Since both the starting chlorocarbon and the $C_{10}Cl_8$ end-product are solids at room temperature, the relative amounts of the liquid vehicle and the temperature at which the reaction is conducted will determine whether a solution or a slurry or both will be present during the course of the reaction. These characteristics are also affected by the properties of the phosphorus components and also by the nature of the RCl product, which accompanies in stoichiometric amount the $C_{10}Cl_8$ product, as indicated in the generalized equation above. The liquid vehicles include most of the better known commercial solvents, such as hydrocarbons, including pentane, hexane, cyclohexane, benzene, toluene, halogenated solvents, comprising methylene chloride, chloroform, carbontetrachloride, trichloroethylene, dichloropropane, ketones and esters, such as acetone, ethylacetate, ethers, such as diethyl ether, tetrahydrofuran and the like. The solvent often is chosen with the purpose to allow the isolation of the chlorinated phosphorus end-product preferably by distillation or crystallization.

A preferred method of carrying out the reaction comprises conditions at which the $C_{10}Cl_8$ product separates out in crystalline form from the reaction mixture. Such conditions exist when the $C_{10}Cl_8$ material is only partially soluble in the liquid vehicle. By the selection of the proper liquid media and of the preferred reaction temperature a wide range of combinations are available to achieve such conditions. One of these conditions comprises the use of saturated hydrocarbons at around room temperature. Under such conditions the initially yellow slurry of the $C_{10}Cl_{10}$ starting material turns gradually greenish-blue on the addition of the phosphorous ester, with the simultaneous separation of the dark blue $C_{10}Cl_8$ end-product in crystalline form. The workup of the reaction mixture consists of a simple filtration of the crystalline precipitate and rinsing of the filter cake with an appropriate liquid in which the $C_{10}Cl_8$ product is insoluble or only sparingly soluble. The dark blue chlorocarbon is obtained in this fashion in analytical and spectroscopical purity. The mother liquors of the filtration contain the RCl and the phosphorus co-products. It is often advantageous to work up these liquids because of the high purity and high conversion in which they were formed may render the method the best suited one for the preparation of those products. This seems to be the case especially with unsaturated phosphorus compounds, such as allyl, propargyl and crotyl, phosphites, phosphonites and phosphinites. The phosphoro, phosphono and phoshinochloridate of these unsaturated esters are obtained in high purity and yield, under mild reaction conditions, and the method seems to be superior to all of the presently known methods of preparing unsaturated phosphoric, phosphonic and phosphinic acid chlorides.

Pressure does not seem to play an important role in the reaction proper, which can be conducted at and both below and above atmospheric pressure. When the RCl product is gaseous at the temperature at which the reaction is carried out or if it has the lowest boiling point of all the components of the reaction mixture, it is advantageous sometimes to employ less than atmospheric pressures in order to isolate and utilize the RCl material.

The dark blue $C_{10}Cl_8$ chlorocarbon is a very reactive chemical that undergoes a wide variety of reactions yielding useful derivatives. For instance, the chlorination of $C_{10}Cl_8$ yields white crystalline chlorocarbons of pronounced biological activity, a property which is very useful in pesticidal applications. Also, the simple thermal treatment of the dark blue-purple $C_{10}Cl_8$ yields a tan colored rearranged product of similar pronounced pesticidal properties.

The process described above is very simple to carry out in both batch operations and in continuous systems. The mild reaction conditions, short contact times and simplicity of the necessary operating equipment make the novel chlorocarbon readily available in large scale operations. Further details, illustrating several preferred combinations, are indicated in the following examples, which, however, are not intended to limit the generally broad scope of the present invention.

*Example I*

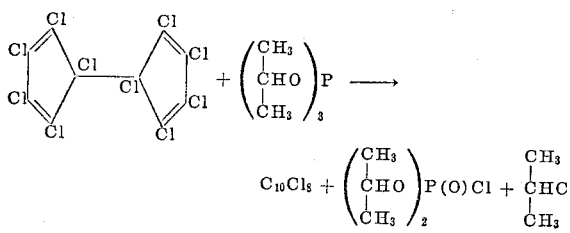

To a 500 ml. 3-neck flask, provided with stirrer, thermometer, dropping funnel and a reflux condenser there was added 47.5 g. (0.1 mole) of bis(pentachlorocyclopentadienyl) and 200 ml. of pentane. The flask was immersed into a container provided with tap water circulation. Through the dropping funnel there was added slowly to the stirred slurry of the chlorocarbon a solution of 25.2 g. (0.121 mole) of triisopropyl phosphite in 25 ml. of pentane, while keeping the temperature of the reaction mixture at around 25° C. Because of the mildly exothermic reaction, this can be done by tap water cooling. The addition of the phosphite causes an immediate formation of a blue color and the concomitant disappearance of the yellow slurry of the $C_{10}Cl_{10}$ chlorocarbon. At the end of the addition of the phosphite all of the yellow slurry of the starting material became replaced by the dark blue slurry of the dechlorinated material. The $C_{10}Cl_8$ product, which is in uniform crystalline state, is filtered off and rinsed three times with 20 ml. portions of pentane each. The air dried product, which is formed in 76% yield, represents a dark blue, highly crystalline chlorocarbon of the $C_{10}Cl_8$ composition with the following analytical, physical and spectral characteristics:

*Analysis.*—Calculated for $C_{10}Cl_8$: carbon, 29.75%, chlorine, 70.25%, molecular weight, 403.8. Found: carbon, 29.6%, chlorine, 70.1%, molecular weight, 402 (by ebullioscopy in benzene).

The $C_{10}Cl_8$ chlorocarbon is soluble in most of the organic solvents, including hydrocarbons, such as hexane, benzene, toluene, chlorinated solvents, such as methylene chloride, chloroform, carbon tetrachloride, trichloroethylene, mono-, di- and trichlorobenzenes, oxygenated solvents such as ether, acetone, ethyl acetate, and in carbon disulfide. It can be recrystallized from the above solvents, when it forms rhombic plates or sturdy twins. It is insoluble in water and only sparingly soluble in the lower alcohols.

The $C_{10}Cl_8$ chlorocarbon has a characteristic infrared spectrogram, shown in the drawing, with absorption maxima at 6.55, 7.56, 7.97, 8.10, 8.63, 10.37, 13.03, 14.24, 14.53 and 15.18 microns. Thus the spectrum indicates the total absence of the carbon-hydrogen modes.

The ultraviolet maximum occurs at $\gamma_{max}$ (isooctane) 387 m$\mu$ ($\epsilon$ 37,500), $\gamma_{max}$ (benzene) 390 m$\mu$ ($\epsilon$ 30,500). The visible absorption maximum is at $\gamma_{max}$ (isooctane) 610 m$\mu$ ($\epsilon$ 336), $\gamma_{max}$ (benzene) 615 m$\mu$ ($\epsilon$ 350).

*Example II*

The procedure of Example I was exactly repeated except that 20.2 g. (0.121 mole) of triethyl phosphite was used to dechlorinate the $C_{10}Cl_{10}$ chlorocarbon to the $C_{10}Cl_8$ product, which was obtained in 66% yield.

*Example III*

The procedure of Example I was used except that the corresponding amount of trimethyl phosphite was substituted for triisopropyl phosphite. The dark blue $C_{10}Cl_8$ chlorocarbon was obtained in better than 50% yield.

*Example IV*

When tris(2-chloroethyl) phosphite was substituted for triisopropyl phosphite in the procedure of Example I a high yield of $C_{10}Cl_8$ was obtained in crystalline form.

*Example V*

The procedure of Example I was repeated exactly except that triallyl phosphite was substituted for triisopropyl phosphite. After the filtration of the crystalline $C_{10}Cl_8$ product the mother liquors were worked up by distillation yielding diallyl phosphorochloridate, $$(CH_2\text{---}CH\text{---}CH_2O)_2P(O)Cl$$

boiling at 49° C. at 0.27 mm. pressure, $n_D^{21}$ 1.4410 and allyl chloride, boiling at 45° C. at atmospheric pressure.

*Example VI*

The dechlorination of bis(pentachlorocyclopentadienyl) was effected as described in the procedure of Example I except that diethyl phenylphosphonite was used, in equivalent amount, instead of triisopropyl phosphite and that the pentane solvent was replaced by the same volume of n-heptane. The dark blue $C_{10}Cl_8$ product was obtained in high yield and purity.

The compound prepared by each of the above examples, besides having the aforementioned use as an intermediate in the preparation of biological compounds, has significant uses as a dye or pigment, because of its deep blue color and its significant solubilities in various vehicles. Being soluble in many non-aqueous solvents, it may be dissolved in monomeric olefins prior to polymerization, or it may be introduced into plastics dissolved in a suitable organic solvent or plasticizer. In these manners the color can be transmitted to the plastic composition or article, either prior to or subsequent to fabrication. The solutions of the new compound may also be used to impregnate fabrics or other porous articles which, after evaporation of the solvent, will take the characteristic blue color, which will be relatively permanent and fast, with respect to water washing.

The embodiments of the invention in which an exclusive property or privilege is claimed are defined as follows:

1. A compound of the empirical formula $C_{10}Cl_8$ characterized by the property of being a dark crystalline material with a bluish-purple reflectance and having the infrared spectrogram shown in the drawing which has characteristic infrared absorptional peaks at the wave lengths of about 6.55, 7.56, 7.97, 8.10, 8.63, 10.37, 13.03, 14.24, 14.53 and 15.18 microns, and having an ultraviolet absorption maximum at about 387 millimicron in isooctane solution and a visible absorption maximum at about 610 millimicron in isooctane solution.

2. The method of dechlorinating bis(pentachlorocyclopentadienyl) $C_{10}Cl_{10}$ to a chlorocarbon of the empirical formula $C_{10}Cl_8$ which comprises reacting the $C_{10}Cl_{10}$ compound with an ester of a trivalent phosphorus acid, said reaction being conducted at a temperature sufficiently low to enable the formation of a blue product.

3. The method of preparing a compound of the empirical formula $C_{10}Cl_8$ which comprises reacting bis(pentachlorocyclopentadienyl) with an ester of a phosphorus acid having the structure

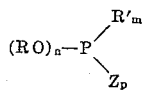

wherein $n$ is an integer from one to three, $m$ is an integer from zero to two, $p$ is an integer from zero to two, provided that the sum of $m+n+p$ is alway three; wherein Z is a halogen atom of the group consisting of fluorine, chlorine, bromine and iodine; and wherein R and R' are each of up to 20 carbon atoms and selected from the class consisting of alkyl, alkenyl, aryl, chloroalkyl and chloroalkenyl; said reaction being conducted at a temperature sufficiently low to enable the formation of a blue product.

4. The method of preparing the compound of the empirical formula $C_{10}Cl_8$, dark crystals, which comprises reacting bis(pentachlorocyclopentadienyl), $C_{10}Cl_{10}$, M.P. 123–124° C., with triethyl phosphite, said reaction being conducted at a temperature sufficiently low to enable the formation of a blue product.

5. The method of preparing the compound of the empirical formula $C_{10}Cl_8$, dark crystals, which comprises reacting bis(pentachlorocyclopentadienyl), $C_{10}Cl_{10}$, M.P. 123–124° C., with triisopropyl phosphite, said reaction being conducted at a temperature sufficiently low to enable the formation of a blue product.

6. The method of preparing the compound of the empirical formula $C_{10}Cl_8$, dark crystals, which comprises reacting bis(pentachlorocyclopentadienyl), $C_{10}Cl_{10}$, M.P. 123–124° C., with trimethyl phosphite, said reaction being conducted at a temperature sufficiently low to enable the formation of a blue product.

7. The method of preparing the compound of the empirical formula $C_{10}Cl_8$, dark crystals, which comprises reacting bis(pentachlorocyclopentadienyl), $C_{10}Cl_{10}$, M.P. 123–124° C., with tris(2-chloroethyl) phosphite, said reaction being conducted at a temperature sufficiently low to enable the formation of a blue product.

8. The method of preparing the compound of the empirical formula $C_{10}Cl_8$, dark crystals, which comprises reacting bis(pentachlorocyclopentadienyl), $C_{10}Cl_{10}$, M.P. 123–124° C., with tributyl phosphite, said reaction being conducted at a temperature sufficiently low to enable the formation of a blue product.

9. The process of carrying out the dechlorination of $C_{10}Cl_{10}$, bis(pentachlorocyclopentadienyl), with an ester of a trivalent phosphorus acid by employing a neutral liquid vehicle under conditions that the $C_{10}Cl_8$ product separates out of the reaction mixture, said reaction being conducted at a temperature sufficiently low to enable the formation of a blue product.

10. The process of carrying out the dechlorination of $C_{10}Cl_{10}$, bis(pentachlorocyclopentadienyl) with an ester of a trivalent phosphorus acid by employing a hydrocarbon as the neutral liquid vehicle under conditions that the $C_{10}Cl_8$ product separates out of the reaction mixture, said reaction being conducted at a temperature sufficiently low to enable the formation of a blue product.

11. The process of carrying out the dechlorination of $C_{10}Cl_{10}$, bis(pentachlorocyclopentadienyl) with an ester of a trivalent phosphorus acid by employing a saturated hydrocarbon as the neutral liquid vehicle under conditions that the $C_{10}Cl_8$ product separates out of the reaction mixture, said reaction being conducted at a temperature sufficiently low to enable the formation of a blue product.

12. The process of carrying out the dechlorination of $C_{10}Cl_{10}$, bis(pentachlorocyclopentadienyl) with an ester of a trivalent phosphorus acid by employing a pentane as the neutral liquid vehicle under conditions that the $C_{10}Cl_8$ product separates out of the reaction mixture, said reaction being conducted at a temperature sufficiently low to enable the formation of a blue product.

13. The process of carrying out the dechlorination of $C_{10}Cl_{10}$, bis(pentachlorocyclopentadienyl) with an ester of a trivalent phosphorus acid by employing a hexane as the neutral liquid vehicle under conditions that the $C_{10}Cl_8$ product separates out of the reaction mixture, said reaction being conducted at a temperature sufficiently low to enable the formation of a blue product.

14. The process of carrying out the dechlorination of $C_{10}Cl_{10}$, bis(pentachlorocyclopentadienyl) with an ester of a trivalent phosphorus acid by employing a mixture of lower saturated hydrocarbons in the 20° to 100° C. boiling range as the neutral liquid vehicle under conditions that the $C_{10}Cl_8$ product separates out of the reaction mixture, said reaction being conducted at a temperature sufficiently low to enable the formation of a blue product.

References Cited

UNITED STATES PATENTS

| | | | |
|---|---|---|---|
| 2,801,269 | 7/1957 | Baranauckas | 260—648 |
| 2,934,470 | 4/1960 | Rucker | 260—648 |

OTHER REFERENCES

Kosolapoff, Organophosphorus Compounds, pp. 213–214, John Wiley & Sons, Inc., New York (1950).

LEON ZITVER, *Primary Examiner.*

J. W. WILLIAMS, S. H. BLECH, K. H. JOHNSON, *Assistant Examiners.*